Dec. 11, 1962 V. A. RAYBURN 3,067,496
ARTICLE-ASSEMBLING APPARATUS
Filed June 9, 1960 4 Sheets-Sheet 4

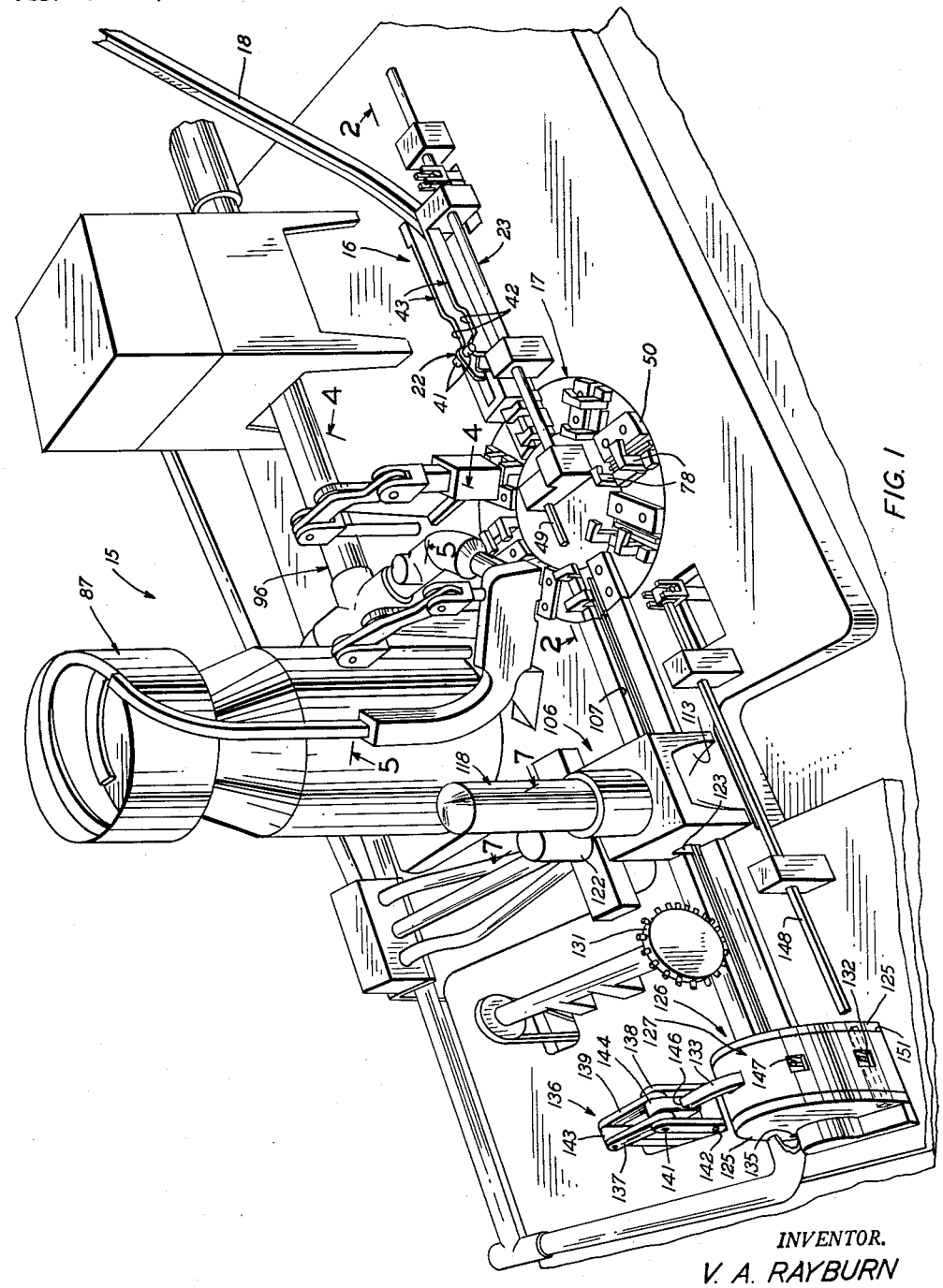

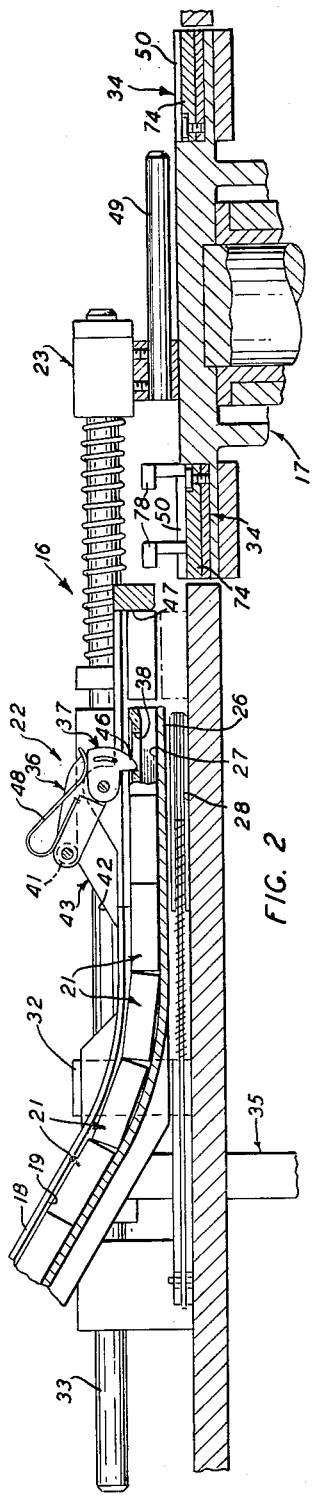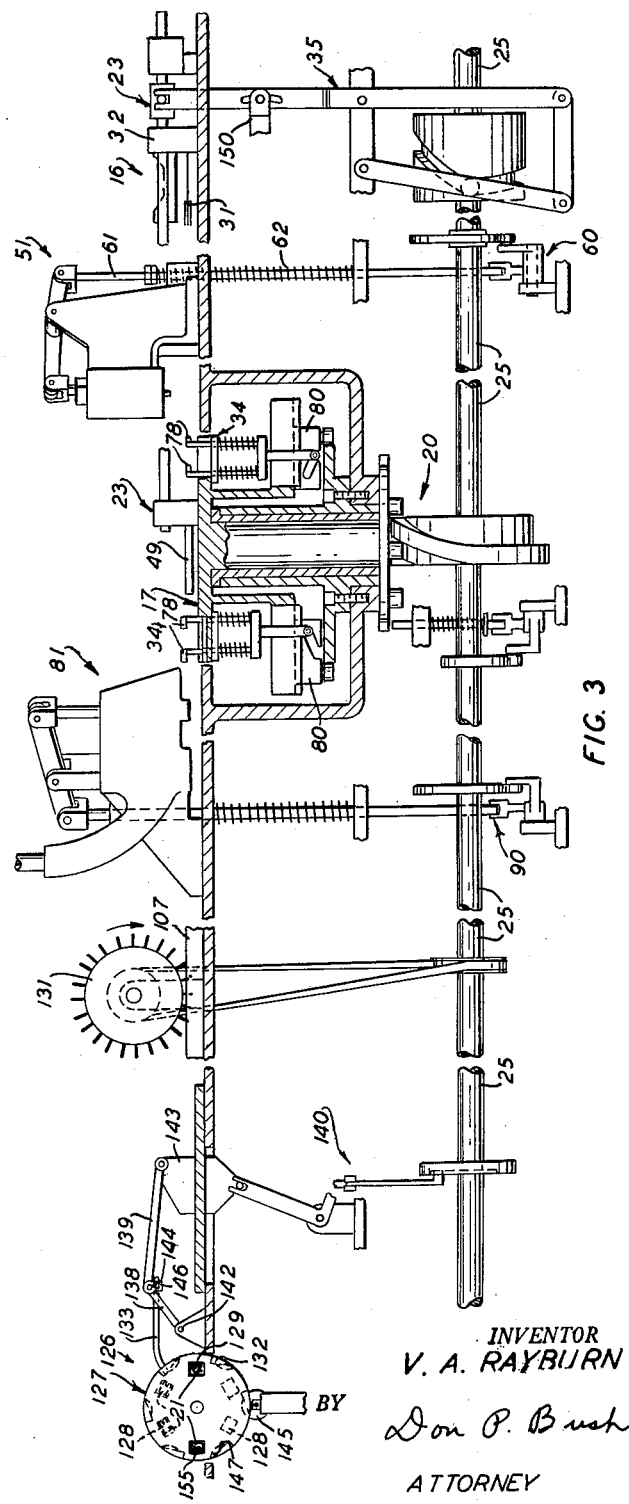

INVENTOR.
V. A. RAYBURN
BY Don P. Bush
ATTORNEY

United States Patent Office 3,067,496
Patented Dec. 11, 1962

3,067,496
ARTICLE-ASSEMBLING APPARATUS
Vincent A. Rayburn, Baltimore, Md., assignor to Western Electric Company, Incorporated, New York, N.Y., a corporation of New York
Filed June 9, 1960, Ser. No. 34,900
12 Claims. (Cl. 29—203)

The present invention relates to article-assembling apparatus and more particularly, although not exclusively, to apparatus for assembling a carbon insert in an aperture in a porcelain block of a lightning protector for communications equipment.

In the manufacture of certain types of lightning protectors for communications equipment, a carbon insert, formed by an article-forming apparatus similar to that disclosed in my copending application Serial No. 27,731, filed on May 9, 1960, now Patent 3,052,919, is cemented in an aperture in a porcelain block by a material dispensing and applicating apparatus similar to that disclosed in a copending application Serial No. 34,950, filed on June 9, 1960, now Patent 3,052,208, in the names of G. P. Adams and V. A. Rayburn. Because of the relatively small size and fragile nature of the carbon insert and porcelain blocks and the relatively close tolerances of the cross sectional dimensions of the insert with respect to the cross sectional dimensions of the aperture in the porcelain block, it has been found difficult to assemble the insert and porcelain block satisfactorily with automatic machines at relatively high speeds with a high degree of efficiency.

In the past, in the event that the aperture in the porcelain block was not aligned properly with the insert during the assembly of the insert in the block, the relatively fragile parts were often chipped or broken which caused malfunctioning of the assembling apparatus, reduced the volume of output of satisfactory lightning protectors and caused inefficient operation of the assembling apparatus.

An object of the present invention is to provide a new and improved article-assembling apparatus.

A further object of the present invention is to provide new and improved apparatus for assembling a carbon insert in an aperture in a poreclain block of a lightning protector.

A still further object of the present invention is to provide a new and improved, relatively efficient apparatus for assembling relatively fragile parts in relatively close tolerance apertures in relatively fragile blocks at a relatively high rate of speed with an increase in the percentage of satisfactory articles assembled thereby.

An article-assembling apparatus embodying certain principles of the present invention may include an insert inserting device. The inserting device has a housing in which a slideway is formed. A combined plunger and valve member is mounted slidably in the slideway and cooperates therewith to permit passage of air between at least a portion of the member and the slideway during a portion of the travel of the member in the slideway. Means are provided for feeding an insert to the slideway transversely thereof adjacent to a free end of the member. The slideway is substantially complementary in cross section to the cross section of the insert to permit sliding fit of the insert in the slideway. Means are provided for supporting a block with an aperture therein in alignment with the member and discharge end of the slideway. Vacuum-producing means are utilized for reducing the air pressure in the slideway above the discharge end thereof to a pressure below the pressure of the surrounding atmosphere so that the insert, which is positioned in the slideway, is held against the bottom of the member by air pressure. Means are provided for moving the member in the slideway toward the aligned aperture in the block. The movement of the member serves to prevent the vacuum-producing means from causing the air pressure to continue to hold the insert against the member and thus allowing the insert to be placed in the aperture in the block by the member and remain in the aperture when the member is retracted.

Other objects and advantages of the present invention will be more readily understood from the following detailed description of a specific embodiment thereof, when read in conjunction with the appended drawings, in which:

FIG. 1 is a fragmentary, perspective view of an article-assembling apparatus embodying certain principles of the present invention;

FIG. 2 is an enlarged, fragmentary section of the apparatus of FIG. 1 taken along line 2—2 thereof;

FIG. 3 is a schematic view of the drive system for the apparatus of FIG. 1;

Figure 7:
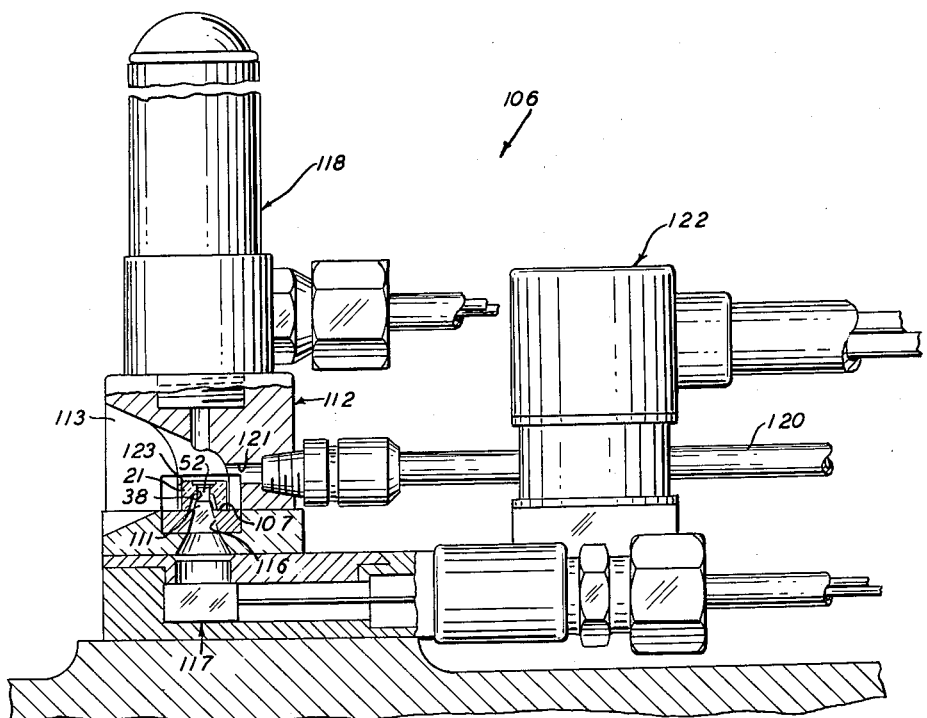
FIG. 7 is an enlarged, fragmentary section of the apparatus of FIG. 1 taken along line 7—7 thereof.

Referring now to FIGS. 1 and 2 of the drawings, there is shown an article-assembling apparatus, designated generally by the numeral 15. The article-assembling apparatus 15 includes a feeding device, designated generally by the numeral 16, positioned adjacent to a rotary turntable, designated generally by the numeral 17. The turntable 17 is indexed periodically by suitable cam-operating indexing mechanism, designated generally by the numeral 20, which is driven by a shaft 25 (FIG. 3). The feeding device 16 (FIGS. 1 and 2) includes a discharge chute 18 provided with a passageway 19 which directs a column of porcelain blocks, designated generally by the numerals 21—21, from an elevated, conventional, vibratory feeder unit (not shown), in serial, end-to-end, abutting arrangement.

Positioned at the lower end of the discharge chute 18 is an escapement assembly, designated generally by the numeral 22, which insures the feed of successive porcelain blocks 21—21, one at a time, to a reciprocating pusher, designated generally by the numeral 23. The bottom 26 of the discharge chute 18 extends a short distance into the escapement assembly 22 to separate the interior thereof into an upper passageway 27 and a lower passageway 28. The pusher 23 is provided with an elongated arm 31 which is connected to a slide block 32 secured adjustably to a push rod 33. The elongated arm 31 is utilized to push successive blocks 21—21 into successive clamping devices, designated generally by the numerals 34—34, which are supported by the turntable 17 and spaced around the outer periphery thereof. The push rod 33 is reciprocated in synchronism with the indexing mechanism for the turntable 17 by a cam-actuated mechanism, designated generally by the numeral 35 (FIG. 3), which, in turn, is driven by the shaft 25.

Mounted pivotally in the escapement assembly 22 is a release pawl, designated generally by the numeral 36, provided with a yieldable, spring-biased pawl head, designated generally by the numeral 37. The spring-biased pawl head 37 is movable into and out of the upper passageway 27 and into and out of an elongated central aperture 38 in the porcelain block 21 adjacent to the leading block in the column of blocks in the upper passageway 27 of the chute 18 for engaging the porcelain block adjacent to the leading block in the column and pushing the column of porcelain blocks back up the chute a sufficient distance to release the leading porcelain block.

When the pawl 36 is in its fully clockwise position, as viewed in FIG. 2, the pawl head 37 engages and captures the porcelain block 21 adjacent to the leading porcelain block 21 and prevents the engaged porcelain block from being discharged prematurely and fouling the lower passageway 28 in the path of the reciprocating pusher 23. The end of the pawl 36 opposite the head 37 is provided with a pair of cam rollers 41—41 which project laterally from opposite sides thereof. The cam rollers 41—41 engage camming surfaces 42—42 on a matched pair of release cams, designated generally by the numerals 43—43. The cams 43—43 are secured to the sliding block 32 and, accordingly, move synchronously with the pusher 23 as the pusher 23 is reciprocated in timed relationship with the turntable 17.

In operation, when the pusher 23 is being retracted, the cam rollers 41—41 ride the highest portions of the camming surfaces 42—42 and the pawl 36 is in its extreme clockwise position, as viewed in FIG. 2, wherein a bill 46 of the head 37 is engaged in the aperture 38 in the block 21 adjacent to the leading block 21 of the column of blocks 21—21 in the upper passageway 27. The foremost one of the porcelain blocks 21, which has been previously freed to drop into the path of the pusher 23, is in position to be moved onto the turntable 17 by the pusher 23. As the pusher 23 moves to the right, as viewed in FIG. 2, the pusher pushes the foremost block 21 onto the turntable 17.

During this rightward stroke of the pusher 23, the cams 43—43 move to the right with the slide block 32, and the cam rollers 41—41 move down inclined portions of the camming surfaces, allowing the pawl 36 to be pivoted in a counterclockwise direction due to its own weight and to the weight of the column of porcelain blocks 21—21 in the inclined discharge chute 18. The blocks 21—21 move forward until the leading block 21 is stopped by an abutment 47. Subsequently, when the pusher 23 is retracted to the left, the pawl 36 is cammed to its clockwise position to engage the aperture 38 in the next block 21 to release the leading block 21 and permit the leading block 21 to drop into the lower passageway 28. The pawl 36 also prevents the remaining blocks 21—21 in the column from moving toward the abutment 47. The push rod 33 is provided with a second pusher element 49 which functions to eject blocks 21—21 from a turntable 17 at a position 180° removed from the feeding device 16.

The bill 46 of the pawl head 37 is spring biased by a leaf spring 48. The bias of the spring 48 is sufficiently strong to prevent the weight of the column of blocks 21—21 in the discharge chute 18 from moving the bill 46 of the pawl head 37 relative to the rest of the pawl 36. However, the bias of the spring 48 is weak enough to prevent damage to the porcelain block 21 should the bill 46 of the pawl head 37 encounter difficulty in entering the aperture 38 in a block 21 due to improper indexing.

Figure 4:
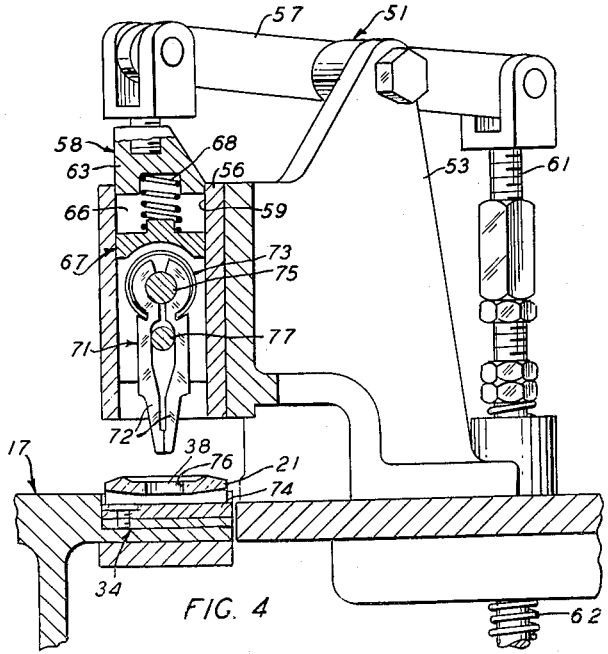
FIG. 4 is an enlarged, fragmentary section of the apparatus of FIG. 1 taken along line 4—4 thereof.

After the block 21 has been fed in place in a keeper 50 of one of the clamping devices 34—34 on the turntable 17, the porcelain block is indexed to a centering station, wherein a centering device, designated generally by the numeral 51 (FIG. 4), orients the porcelain block 21 on the turntable 17 under the keeper 50 of the associated clamping device 34, and the porcelain block is clamped in place on the turntable 17 in the keeper 50 in preparation for a subsequent operation, wherein a carbon insert 52 (FIG. 5) is placed in the rectangular aperture 38 of the porcelain block 21.

The centering device 51 includes a frame 53 having secured thereto a guide block 56. A vertically extending guideway 59 is formed in the guide block 56. Secured pivotally to the frame 53 is a lever arm 57, which is connected at one end to a plunger, designated generally by the numeral 58, designed to reciprocate in the guideway 59. The lever arm 57 is actuated by an adjustable spring-loaded push rod 61, the downward movement of the rod 61 being controlled by a cam-actuated mechanism, designated generally by the numeral 60 (FIG. 3), which, in turn, is driven by the shaft 25. The cam-actuated mechanism 60 is operated in timed relationship with the turntable 17, to compress a relatively heavy compression spring 62 which is subsequently released by the mechanism 60 to move the plunger 58 downwardly.

The plunger 58 includes a centering slide 63 mounted reciprocably in the guideway 59 and provided with a rectangular, longitudinally extending cutout portion 66, which cutout portion 66 receives slidably a centering-pin slide member, designated generally by the numeral 67. The centering-pin slide member 67 is capable of limited vertical movement relative to the centering slide 63 against the action of a relatively light compression spring 68, as compared to the compression spring 62. The slide member 67 carries a centering pin, designated generally by the numeral 71, which is formed by two half-pin members 72—72. The half-pin members 72—72, forming the centering pin, are retained by an arcuate spring clip 73 on opposite sides of a pivotal pin 75 secured to the slide member 67. This mounting arrangement is designed to permit the nose portions of the half-pin members 72—72 to be spread apart by a camming dowel 77, which is positioned between the half-pin members 72—72 and is fixed to the centering slide 63.

In operation, as the centering slide 63 is moved downwardly by the lever arm 57, it carries with it the slide member 67 and centering pin 71. If the aperture 38 in the porcelain block 21 is misaligned, as is usually the case, the nose portions of the centering pin 71 enter the aperture 38 in the block 21. As the centering slide 63 continues to move downwardly, the tapered nose portions of the centering pin 71 are forced through the aperture 38 in the porcelain block 21 and finally hit a base member 74 of the clamping device 34, on the turntable 17. The centering pin 71 then remains stationary and the centering slide 63 and the camming dowel 77 move downwardly relative to the half-pin members 72—72 of the centering pin 71 to urge the tapered nose portions of the half-pin members apart and into engagement with side walls 76—76 of the aperture 38 of the block 21 to align the aperture 38 of procelain block 21 in the clamping device 34. The aligned porcelain block 21 is then clamped in place in the device 34 by a clamping element 78 of the device 34 through the action of a cam 80 (FIG. 3) secured to the turntable 17.

It is required to place one of the carbon inserts 52—52 in a complementary aperture 38 formed in a porcelain block 21 in preparation for a subsequent operation wherein cement is applied to portions of the porcelain block 21 immediately adjacent to the sides of the carbon insert to secure the latter fixedly in place.

Accordingly, the clamped, aligned porcelain block 21 is indexed by the turntable 17 to a carbon-inserting device, designated generally by the numeral 81 (FIG. 5), for facilitating the insertion of the carbon insert 52 in the porcelain block 21 preparatory to the cementing operation. The carbon-inserting device 81 includes a housing, designated generally by the numeral 82, provided with an arcuate feedway 83 communicating with a chute 86 leading from a conventional vibratory hopper feed device, designated generally by the numeral 87 (FIG. 1), which supplies the carbon inserts 52—52 to the feedway 83. The discharge end of the feedway 83 opens into a vertically extending slideway 88 formed in the housing 82, the cross-sectional dimensions of the slideway 88 being substantially equal to the cross-sectional dimensions of the carbon inserts 52—52 to achieve a sliding fit therebetween.

Figure 6:
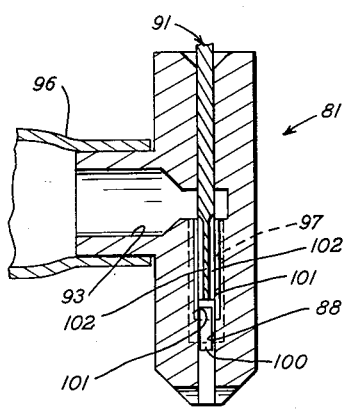
FIG. 6 is a fragmentary section of the apparatus of FIG. 5 taken along line 6—6 thereof.

Mounted reciprocably in the vertical slideway 88 is a combined plunger and valve member, designated generally by the numeral 91, which is attached threadedly to a clevis 92 on an intermittently operated rocker arm, designated generally by the numeral 95. The clevis 92 and the combined plunger and valve member 91 are operated by a spring-loaded push rod 94 and a cam-actuated mechanism, designated generally by the numeral 90, similar to the mechanism 60 for operating the push rod 61. The push rod 94 is reciprocated vertically in timed relationship with the indexing of the rotary turntable 17, which indexes protector blocks 21—21 successively into loading positions beneath the slideway 88 with the apertures 38—38 in the blocks 21—21 in registration with a restricted discharge end 89 of the slideway 88. Communicating with the slideway 88 above the discharge end of the feedway 83 is a main air channel 93 connected to a vacuum line, designated generally by the numeral 96 (FIGS. 1 and 6), in which a predetermined partial vacuum is maintained by a suitable exhaust system (not shown). Communicating with the main air channel is a side air channel 97, which leads from the main air channel 93 to a side port 98 directly opposite the discharge end of the feedway 83 which may be divided by a bridging element 100. The bridging element 100 can be used to insure that the corners of the carbon inserts 52—52 do not enter the side port 98 and thereby cause the carbon inserts to be canted in the slideway 88.

The configuration of the member 91 is such that the member can serve dual purposes. The member 91 acts as an ejector for thrusting carbon inserts 52—52 through the slideway 88 and into the apertures 38—38 in the porcelain blocks 21—21. The member 91 acts also as a valve stem to control the flow of air which normally enters the main air channel 93 through the side port 98 and through clearances formed by grooves 101—101 formed in two opposed sides of the slideway 88 and cooperating slots 102—102 formed in the member 91.

The slots 102—102 in the member 91 extend from the free end thereof partly along the length of the member so that, when the member 91 is in a retracted position, the slots 102—102 cooperate with the grooves 101—101 in the sides of the slideway 88 to permit air to be sucked along the slideway 88 into the cooperating grooves 101—101, and thence to the vacuum line 96 through the main air channel 93. Similarly, air is sucked through the slideway 88 into the side port 98, through the side air channel 97, through the main channel 93, and into the vacuum line 96. As a result of this suction, the leading carbon insert 52, positioned in the slideway 88 is held against the bottom of the member 91 and also against the portion of the slideway 88 provided with the side port 98.

Subsequently, as the clevis 92 descends, the member 91 moves first to a position in which the side port 98 is cut off and covered by the member 91, and then to a position in which the flow of air through the cooperating grooves 101—101 and slots 102—102 is cut off. By the time the latter action occurs, the carbon insert 52 is in the restricted discharge end 89 of the slideway 88, and is entering into the aperture 38 in the porcelain block 21 by the continued movement of the member 91.

It may be seen that the arrangements of the side port 98 and the cooperating grooves 101—101 and slots 102—102 insure that the carbon insert 52 is correctly positioned to facilitate the insertion of the insert 52 by the descending member 91. In addition, any foreign matter, e.g. particles of carbon which may become abraded from the surface of the carbon inserts 52—52, is removed via the vacuum line 96, and does not remain to interfere with the functioning of the device 81.

As the porcelain blocks 21—21 are removed from the carbon inserting device 81, it is desirable to check for the presence of one of the carbon inserts 52—52 in the aperture 38 in each of the porcelain blocks 21—21. Accordingly, a detector-ejector device, designated generally by the numeral 106 (FIGS. 1 and 7), is provided to check for the presence of the carbon inserts 52—52 in the apertures 38—38 in the blocks 21—21. The detector-ejector device 106 includes a longitudinally extending guideway 107 having a cross-sectional configuration matching the cross-sectional configuration of the porcelain block 21. The guideway 107 includes a raised central portion 111 which supports the loosely fitting carbon insert 52 in proper position within the aperture 38 of the porcelain block 21. The porcelain blocks 21—21 are pushed off the turntable 17 and are advanced in end-to-end abutting alignment by the pusher element 49 of the pusher rod 33.

A housing, designated generally by the numeral 112, of the detector-ejector device 106, is provided with a cutout 113. The width of the cutout portion 113 is such that, when one of the porcelain blocks 21—21 is centered with respect to the cutout 113, the ends of the block 21 will be aligned with the sides of the cutout 113 and may be ejected from the housing 112 through the cutout 113. At the vertical centerline of the housing 112 and the center of the cutout 113, the raised portion 111 of the guideway 107 is interrupted to form an aperture 116. Positioned beneath and in registry with the aperture 116 is a suitable photocell, designated generally by the numeral 117, which is sensitive to a predetermined intensity level of illumination such as a cadmium-sulfide type photocell. Positioned in the top of the housing 112 is a light source, designated generally by the numeral 118, which produces a beam of light of sufficient intensity to stimulate the photocell 117.

It may be seen that the presence of a carbon insert 52 in the aperture 38 of the porcelain block 21 will prevent the light beam emitted from the light source 118 from illuminating the photocell 117 directly. The side of the housing 112, directly opposite the cutout 113, is provided with a port 121 through which a blast of compressed air directed from a suitable source (not shown) through a line 120 may pass to impinge upon portions of the porcelain block 21 above the center of gravity of the block. The photocell 117 is connected to a circuit (not shown) which controls the operation of a solenoid valve, designated generally by the numeral 122, through which compressed air may be introduced to the port 121.

In operation, the porcelain blocks 21—21, which should contain carbon inserts 52—52, are indexed along the guideway 107 by the pusher element 49 of the pusher rod 33. If one of the porcelain blocks 21—21 reaches the center of the housing 112 without a carbon insert 52 in the aperture 38 thereof, the light beam from the light source 118 will impinge upon the photocell 117 directly through the central aperture 38 in the porcelain block 21. When the latter occurs, the valve 122 is actuated to direct a blast of compressed air through the port 121 to tip the block 21 over and blow the block 21 off of the guideway 107 through the cutout 113.

It will be noted that the housing 112 has entrance and exit passageways 123—123 on the sides of the cutout 113 which closely receive the porcelain blocks 21—21. Therefore, the relationship of the entrance and exit passageways 123—123 and the cutout 113 is such that if the photocell 117 is activated by light passing through the spaces between successive porcelain blocks 21—21, the air blast will not eject any of the blocks 21—21 since each of the two blocks 21—21 positioned in the housing 112 of the detector-ejector device 106 would be partly within one of the passageways 123—123 and so restrained against ejection.

Preparatory to feeding porcelain blocks 21—21 containing loosely positioned carbon inserts 52—52 to a frit-cement applicator (not shown), it is necessary to invert each block 21 and the associated carbon insert 52. The blocks 21—21 and associated carbon inserts 52—52 are inverted by a block-inverting device, designated generally by the numeral 126 (FIGS. 1 and 3), which includes a rotatable, cylindrical drum, designated generally by the numeral 127, mounted rotatably between a pair of bearing blocks 125—125. The drum 127 is provided with six chambers 128—128 configured to receive closely the loosely assembled porcelain blocks 21—21 and carbon inserts 52—52.

The porcelain blocks 21—21 are fed successively from the guideway 107, through an aligned passage 129 in the right bearing block 125 and into individual chambers 128—128 of the rotatable drum 127. The feeding of the porcelain blocks 21—21 and associated inserts 52—52 is accomplished by a rotating, rubber-paddle wheel 131 which urges the blocks 21—21, one at a time along the guideway 107 and into an empty chamber 128 as one of the chambers 128—128 is moved into a position in alignment with the guideway 107. Also, the vacuum line 96 is connected to a port 135 in the left bearing block 125 to help suck successive ones of the porcelain blocks 21—21 into successive chambers 128—128 as the chambers 128—128 are indexed to a position adjacent to the port 135 and to hold the blocks in position in the chambers.

The periphery of the drum 127 is provided with angular notches 132—132 designed to cooperate with a resilient indexing finger 133 forming a part of a drum-indexing mechanism, designated generally by the numeral 136. The drum-indexing mechanism 136, in addition to the resilient indexing finger 133, includes an articulated linkage, designated generally by the numeral 137, including two pairs of links 138—138 and 139—139 secured together pivotably at upper ends thereof by a pin 141. The lower end of the pair of links 138—138 is secured pivotably to the frame of the apparatus by a stationary pin 142. The lower ends of the links 139—139 are connected pivotally to a reciprocating slide 143 which is operated in timed relationship with respect to the pusher element 49 of the pusher 23 and other moving parts of the apparatus by a cam-actuated mechanism, designated generally by the numeral 140 (FIG. 3). Secured pivotably to and depending from the pin 141 between the connected ends of the pairs of links 138—138 and 139—139 is a block 144 having a slot 146 into which the resilient indexing finger 133 is secured adjustably.

It may be seen that, when the slide 143 moves to the left, as viewed in FIG. 3, the indexing finger 133 becomes engaged in one of the notches 132 and causes the drum 127 to index in a counterclockwise direction through an angle of 60°. Subsequently, when the slide 143 is withdrawn, the indexing finger 133 is withdrawn from the notches 132—132 while the rotatable drum 127 is held against movement by a spring-urged latch provided with a contact roller 145, which engages an arcuate-shaped counter recess 147 formed in the bottom of the notch 132. The spring-urged latch also functions as a stop to insure registry of successive chambers 128—128 with respect to the guideway 107 and a reciprocatory push rod 148 (FIG. 1) connected operatively to the mechanism 35 by a linkage 150 (FIG. 3).

After three successive indexing movements of the drum 127, the porcelain block 21 in the associated chamber 128 has been rotated through 180° and the porcelain block 21 is in an inverted position. The inverted porcelain block 21 with its carbon insert 52 is ejected from the associated chamber 128, by the reciprocating push rod 148 which operated through an aligned passage 155 in the right bearing 125, and onto a conveyor of a material dispensing and applicating apparatus (not shown), but disclosed in the copending G. P. Adams, V. A. Rayburn application. The push rod 148, which operates in timed relationship with respect to the drum-indexing mechanism 136, enters the chamber 128, pushes out the porcelain block 21 and is subsequently retracted free of the chamber 128 to permit resumption of the next indexing movement of the drum 127 to be accomplished.

The right-hand end face 151 of the drum 127, adjacent to the trailing edge of each chamber 128 is provided with inclined camming surfaces (not shown), which serve to push any of the porcelain blocks 21—21 which may be fed into engagement with the block 21 being loaded into the chamber 128 away from the face 151 after a loading operation. This prevents the next porcelain block 121 from interfering with rotation of the drum 127.

Similarly, portions of the right bearing block 125 are provided with inclined camming surfaces (not shown) which push any protruding portions of the porcelain blocks 21—21, positioned in the chambers 128—128, into the chambers 128—128 to prevent interference with operation of the block-inverting device 126.

*Operation*

In the operation of the article-assembling apparatus 15, the porcelain blocks 21—21 are fed, one at a time, to the reciprocating pusher 23, which is utilized to push successive blocks 21—21 into successive clamping devices 34—34 spaced around the outer periphery of the turntable 17. The push rod 33 is reciprocated in synchronism with the indexing mechanism for the turntable 17.

When the pusher 23 is retracted, the cam rollers 41—41 ride on the highest portions of the camming surfaces 42—42 and the pawl 36 is moved into its fully clockwise position, as viewed in FIG. 2, wherein the bill 46 of the head 37 is engaged in the aperture 38 in the block 21 adjacent to the leading block 21 in the upper passageway 27. The porcelain block 21, which has been fed previously into the path of the pusher 23, is ready to be transported to the turntable 17 by the pusher 23. As the pusher 23 moves to the right, as viewed in FIG. 2, the pusher pushes the last-mentioned block 21 into one of the keepers 50—50 of the clamping device 34—34 on the turntable 17.

During this rightward stroke of the pusher 23, the cams 43—43 slide to the right with the slide block 32, and the cam rollers 41—41 move down inclined portions of the camming surfaces, allowing the pawl 36 to be pivoted in a counterclockwise direction due to the weight of the column of porcelain blocks 21—21 in the inclined discharge chute 18. The blocks 21—21 move forward until the leading block 21 is stopped by the abutment 47. Subsequently, when the pusher 23 is retracted to the left, the pawl 36 is cammed to its clockwise position to engage the aperture 38 in the block 21 adjacent to the leading block 21 to release the leading block 21 and permit the leading block to drop into the lower passageway 28 in front of the retracting elongated arm 31.

After the block 21 has been fed in place in the clamping device 34 on the turntable 17, the porcelain block is indexed to the centering device 51. The centering device 51 is used to align the porcelain block 21 on the turntable 17 in the clamping device 34 so that the porcelain block can be clamped in place on the turntable 17 by the clamping element 78 of the clamping device 34 in preparation for the insertion of one of the carbon inserts 52—52 (FIG. 5) in the rectangular aperture 38 of the porcelain block 21.

As the plunger 58 of the centering device 51 is moved downwardly by the lever arm 57, it carries with it the slide member 67 and centering pin 71. If the aperture 38 in the porcelain block 21 is misaligned and the misalignment is sufficient so that the centering pin 71 hits the block 21, the light compression spring 68 will absorb most of the shock resulting from the centering pin 71 striking the block 21. As the centering slide 63 continues to move downwardly with the plunger 58, the tapered nose portions of the centering pin 71 are forced into and through the aperture 38 in the porcelain block 21 and finally hit the base member 74 of the clamping device 34, on the turntable 17. The centering pin 71 then remains stationary as the centering slide 63 continues to move downwardly. Therefore, the half-pin members 72—72 of the centering pin 71 are urged apart to engage the side walls 76—76 of the aperture 38 of the block 21 by the action of the camming dowel 77 secured to and carried by the centering slide 63 to align the aperture 38 in porcelain block 21 in the clamping device 34.

Figure 5:
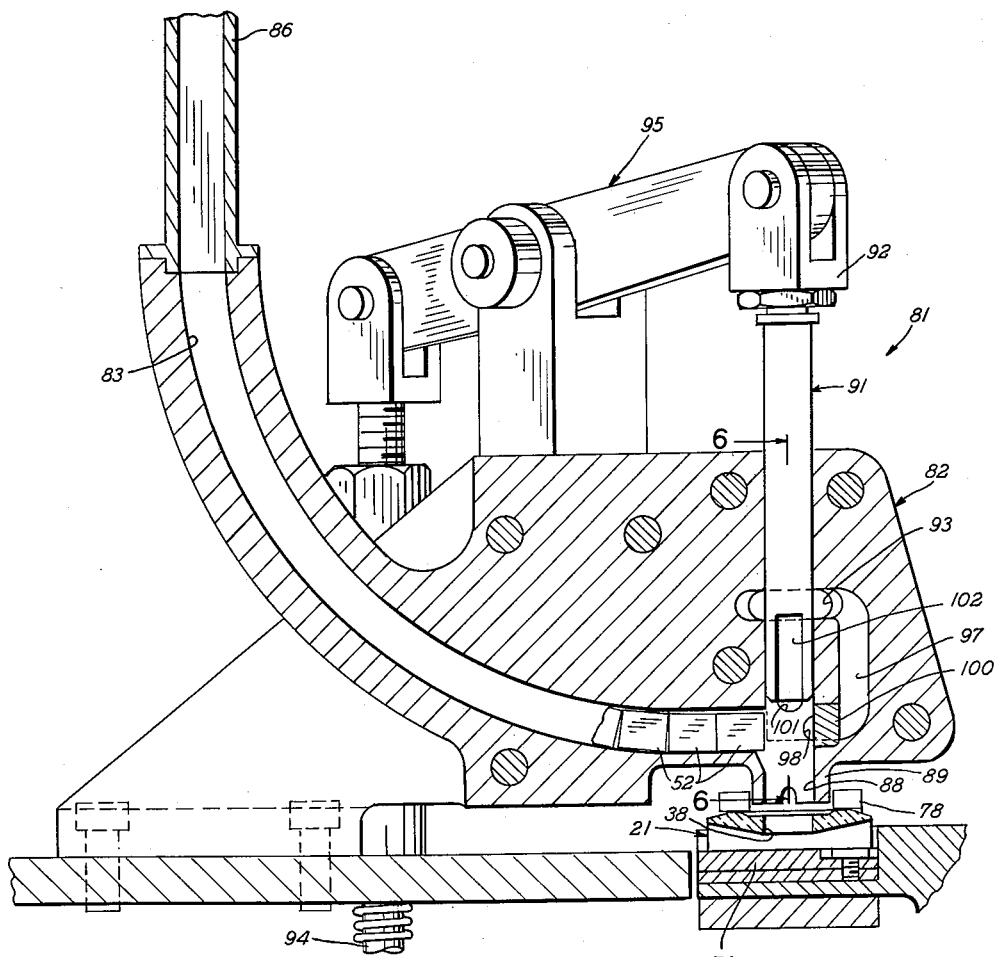
FIG. 5 is an enlarged, fragmentary section of the apparatus of FIG. 1 taken along line 5—5 thereof.

The aligned porcelain block 21 is clamped in place in the device 34 by the clamping element 78. The clamped, aligned porcelain block 21 is indexed by the turntable 17 to the carbon-inserting device 81 (FIG. 5). The carbon inserts 52—52 are fed to the carbon-inserting device 81 from the vibratory hopper feed device 87 through the feedway 83 which feedway 83 opens into the vertically extending slideway 88.

When the member 91 is in the slideway 88 in the initial, retracted position, the slots 102—102 cooperate with the grooves 101—101 in the sides of the slideway 88 to permit air to be sucked along the slideway 88 into the cooperating grooves 101—101, and thence to the vacuum line 96 through the main air channel 93. Similarly, air is sucked through the slideway 88 into the side port 98, through the side air channel 97, through the main channel 93, and into the vacuum line 96. As a result of this suction, the leading carbon insert 52, positioned in the slideway 88, is held against the bottom of the member 91 and also against the side of the slideway 88 provided with the side port 98.

Subsequently, as the ram 95 descends, the member 91 moves first to the position in which the side port 98 is cut off and covered by the member 91, and then to the position in which the flow of air through the cooperating grooves 101—101 and slots 102—102 is cut off. By the time the latter action occurs, the carbon insert 52 is in the restricted discharge end 89 of the slideway 88. The carbon insert 52 is then thrust into the aperture 38 in the porcelain block 21 by the continued movement of the member 91.

The arrangements of the side port 98 and the cooperating grooves 101—101 and slots 102—102 insure that the carbon insert 52 is correctly positioned to facilitate the insertion of the insert 52 by the descending member 91 and that particles of carbon which may become abraded from the surface of the carbon inserts 52—52 are removed via the vacuum line 96.

The loosely assembled porcelain blocks 21—21 and carbon inserts 52—52 are removed from the carbon-inserting device 81 by the pusher element 49 of the pusher rod 33 and moved along the guideway 107. The porcelain blocks 21—21, which should contain carbon inserts 52—52, are pushed through the detector-ejector device 106, which checks for the presence of one of the carbon inserts 52—52 in the aperture 38 in each of the porcelain blocks 21—21.

If one of the porcelain blocks 21—21 reaches the center of the housing 112 without one of the carbon inserts 52—52 being present in the aperture 38 thereof, the light beam from the source 118 will strike the photocell 117 directly through the central aperture 38 in the porcelain block 21. When the latter condition occurs, the valve 122 is actuated to direct the blast of compressed air through the port 121 to tip the block 21 over so that the block 21 tumbles out of the guideway 107 through the cutout 113.

The relationship of the passageways 123—123 and cutout 113 is such that if the photocell 117 is activated by light passing through spaces between successive porcelain blocks 21—21, the air blast will not eject any of the blocks 21—21 since each of the particular blocks 21—21 would be partly within one of the passageways 123—123 and restrained against ejection.

Preparatory to feeding porcelain blocks 21—21, containing loosely positioned carbon inserts 52—52, to a frit cement applicator (not shown), the blocks 21—21 and associated carbon inserts 52—52 are inverted by the block-inverting device 126. The porcelain blocks 21—21 are fed successively from the guideway 107, through an aligned passage in the right bearing block 125 and into individual chambers 128—128 of the rotatable drum 127. The feeding of the porcelain blocks 21—21 and associated inserts 52—52 is accomplished by the rotating, rubber-paddle wheel 131 which urges the blocks 21—21, one at a time, along the guideway 107 and into one of the empty chambers 128—128 as the empty chamber 128 is moved into a position in alignment with the guideway 107 as the drum 127 is indexed by the indexing mechanism 136.

When the slide 143 of the indexing mechanism 136 moves forward, as viewed in FIG. 1, the indexing finger 133 becomes engaged in one of the notches 132 and causes the drum 127 to index in a clockwise direction through an angle of 60°, as viewed from the left-hand side of the drum as illustrated in FIG. 1. Subsequently, when the slide 143 is withdrawn, the indexing finger 133 is withdrawn from the notches 132—132 while the rotatable drum 127 is held against movement by the roller 145 of the spring-urged latch, which engages the arcuate-shaped counter recess 147 formed in the bottom of the notch 132. The spring-urged latch also functions as a stop to insure registry of successive chambers 128—128 with respect to the guideway 107 and the reciprocatory push rod 148.

After three successive indexing movements of the drum 127, the porcelain block 21 in the associated chamber 128 has been rotated through 180° and the porcelain block 21 is in an inverted position. The inverted porcelain block 21 with its carbon insert 52 is ejected from the associated chamber 128, by the reciprocating push rod 148 which operated through the aligned passage 155 in the right bearing 125, and onto a conveyor of a material dispensing and applicating apparatus (not shown). The push rod 148, which operates in timed relationship with respect to the drum-indexing mechanism 136, enters the chamber 128, pushes out the porcelain block 21 and is subsequently retracted free of the chamber 128 to permit resumption of the next indexing movement of the drum 127 to be accomplished.

It is to be understood that the above-described arrangements are simply illustrative of the principles of the invention. Other arrangements may be devised by those skilled in the art which will embody the principles of the invention and fall within the spirit and scope thereof.

What is claimed is:

1. An article-assembling apparatus for assembling an insert in an article, which comprises a housing having a slideway formed therein, a combined plunger and valve member mounted slidably in the slideway and cooperating therewith to permit the passage of air between the member and a wall of the slideway during a portion of the travel of the member along the slideway, means for feeding an insert to the slideway transversely of the slideway and adjacent to a free end of the member, the slideway being substantially complementary in cross section to the cross section of the insert to permit sliding fit of the insert in the slideway, means for supporting an article in alignment with the member and the discharge end of the slideway, vacuum-producing means for reducing the air pressure in the slideway above the discharge end thereof to a pressure below the pressure of the surrounding atmosphere so that the insert which is positioned in the slideway is held against the bottom of the member by air pressure, means for moving the member in the slideway toward the article and assembling the insert into the aligned article, the movement of the member serving to prevent the vacuum-producing means from causing the air pressure to continue to hold the insert against the member and thus releasing the insert from the member, and means for supporting the elements of the assembling apparatus in cooperative relationship.

2. An article-assembling apparatus for assembling inserts in apertures in articles, which comprises a housing having a slideway formed therein, a combined plunger and valve member mounted slidably in the slideway and cooperating therewith to permit the passage of air between the member and a wall of the slideway during a portion of the travel of the member along the slideway, means for feeding inserts one at a time to the slideway transversely of the slideway and above the discharge end thereof adjacent to a free end of the member, the slideway being substantially complementary in cross section to the cross section of the insert to permit sliding fit of the insert in the slideway, means for positioning and supporting successive articles with apertures therein in alignment with the member and the discharge end of the slideway, vacuum-producing means for reducing the air pressure in the slideway above the discharge end thereof to a pressure below the pressure of the surrounding atmosphere so that the insert which is positioned in the slideway is held against the bottom of the member by air pressure, means for moving the member in the slideway toward the article and assembling the insert into the aligned aperture in the article, the movement of the member serving to prevent the vacuum-producing means from causing the air pressure to continue to hold the insert against the member and thus allowing the insert to remain in the aligned aperture in the article when the member is retracted, and means for supporting the elements of the assembling apparatus in cooperative relationship.

3. An article-assembling apparatus for assembling inserts in apertures in blocks, which comprises a housing having a slideway formed therein, a combined plunger and valve member mounted slidably in the slideway and cooperating therewith to permit the passage of air between the member and a wall of the slideway during a portion of the travel of the member along the slideway, a feedway extending transversely of the slideway and terminating therein for feeding inserts one at a time to the slideway adjacent to a free end of the member, the slideway being substantially complementary in cross section to the cross section of the insert to permit sliding fit of the insert in the slideway, means for supporting a block with an aperture therein in alignment with the member and discharge end of the slideway, vacuum-producing means for reducing the air pressure in the slideway above the discharge end thereof to a pressure below the pressure of the surrounding atmosphere so that the insert which is positioned in the slideway is held against the bottom of the member by air pressure, means for moving the member in the slideway toward the aligned aperture in the block and assembling the insert into the aligned aperture in the block, the movement of the member serving to prevent the vacuum-producing means from causing the air pressure to continue to hold the insert against the member and thus allowing the insert to remain in the aperture in the block when the member is retracted, and means for supporting the elements of the assembling apparatus in cooperative relationship.

4. An article-assembling apparatus for assembling inserts in apertures in blocks, which comprises a housing having a slideway formed therein, a combined plunger and valve member mounted slidably in the slideway and cooperating therewith to permit the passage of air between the member and a wall of the slideway during a portion of the travel of the member along the slideway, a feedway extending transversely of the slideway and terminating therein for feeding inserts one at a time to the slideway adjacent to a free end of the member, the slideway being substantially complementary in cross section to the cross section of the insert to permit sliding fit of the insert in the slideway, means for supporting a block with an aperture therein in alignment with the member and discharge end of the slideway, a main air channel communicating with the slideway above the end of the feedway, the slideway having a port in the side thereof directly opposite the discharge end of the feedway, vacuum-producing means for reducing the air pressure in the slideway above the discharge end thereof to a pressure below the pressure of the surrounding atmosphere so that the insert which is positioned in the slideway is held against the side of the slideway in which the port is positioned and against the bottom of the member by air pressure, means for moving the member along the slideway toward the aligned aperture in the block and assembling the insert into the aligned aperture in the block, the member, after having been moved a predetermined distance, serving to prevent the vacuum-producing means from causing the air pressure to continue to hold the insert against the member and thus release the insert in the aperture in the block, and means for supporting the elements of the assembling apparatus in cooperative relationship.

5. An article-assembling apparatus for assembling inserts in apertures in blocks, which comprises a feedway, means for supplying inserts to the feedway, a housing having a slideway formed therein transversely of the feedway and into which the discharge end of the feedway opens, the slideway being substantially complementary in cross section to the cross section of the inserts to permit sliding fit of the inserts in the slideway, a combined plunger and valve member having clearance between the sides thereof and the walls of the slideway, means for positioning and supporting successive blocks with the apertures thereof in alignment with the member and discharge end of the slideway, an air channel communicating with the slideway on the side of the discharge end of the feedway opposite the discharge end of the slideway, the slideway having a port in the side thereof directly opposite the discharge end of the feedway, a vacuum line connected to the air channel and the port so that the leading insert fed from the feedway into the slideway is held against the bottom of the member and also against the side of the slideway in which the port is positioned, means for moving the member with respect to the air channel and side port toward the aligned aperture in the block and for cutting off the air pressure holding the insert against the member and thus releasing the insert to fall and be assembled in the aligned aperture in the block, and means for supporting the elements of the assembling apparatus in cooperative relationship.

6. An article-assembling apparatus for assembling inserts in apertures in blocks, which comprises a housing having a slideway formed therein, a combined plunger and valve member mounted slideably in the slideway and cooperating therewith to permit the passage of air between the member and a wall of the slideway during a portion of the travel of the plunger member along the slideway, means for feeding inserts one at a time to the slideway transversely thereof adjacent to a free end of the member, the slideway being substantially complementary in cross section to the cross section of the inserts to permit sliding fit of the inserts in the slideway, means for indexing a succession of blocks with apertures therein in alignment with the member and discharge end of the slideway, vacuum-producing means for reducing the air pressure in the slideway above the discharge end thereof below the pressure of the surrounding atmosphere so that the insert which is positioned in the slideway is held against the bottom of the member by air pressure, means for moving the member in the slideway toward the aligned aperture in the block and assembling the insert into the aligned aperture in the block, the movement of the member serving to prevent the vacuum-producing means from causing the air pressure to continue to hold the insert against the member and thus releasing the insert in the aperture in the block, and means for supporting the elements of the assembling apparatus in cooperative relationship.

7. An article-assembling apparatus for assembling inserts in apertures in blocks, which comprises an arcuate feedway, means for supplying a column of the inserts to the feedway, a housing having a vertically extending slideway formed therein into which the discharge end of the feedway opens, the slideway being complementary in cross section to the cross section of the inserts to permit sliding fit of the inserts in the slideway, a combined plunger and valve member mounted slidably in the slideway and having clearance grooves in the sides thereof, a turntable for indexing successive blocks with the apertures thereof in alignment with the member and discharge end of the slideway, a main air channel communicating with the slideway above the discharge end of the feedway, a vacuum line connected to the air channel, the slideway having a port in the side thereof directly opposite the discharge end of the feedway, a side air channel connecting the main air channel with the side port so that the leading insert in the column of inserts which is positioned in the slideway is held against the bottom of the member and also against the side of the slideway in which the port is positioned, means for reciprocating the member in timed relationship with the indexing of the rotatable turntable for moving the member downwardly in the slideway with respect to the air channels and side port to lower successive inserts into successive aligned apertures in the successive blocks, the member, after having been moved a predetermined distance, operating to cut off the air pressure holding the successive inserts against the member and thus releasing the successive inserts in the successive aperture in the successive blocks, and means for supporting the elements of the assembling apparatus in cooperative relationship.

8. An article-assembling apparatus for assembling inserts in apertures in blocks, which comprises a feedway, means for supplying a column of the inserts to the feedway, a housing having a grooved vertically extending slideway formed therein into which the discharge end of the feedway opens, the slideway being complementary in cross section to the cross section of the inserts to permit sliding fit of the inserts in the slideway, a combined plunger and valve member mounted slidably in the slideway and having clearance slots in the sides thereof which cooperate with the grooves in the slideway to permit the flow of air in the slideway past the member, a turntable for indexing successive blocks with the apertures thereof in alignment with the member and discharge end of the slideway, a main air channel communicating with the slideway above the discharge end of the feedway, a vacuum line connected to the air channel, the slideway having a port in the side thereof directly opposite the discharge end of the feedway, a side air channel connecting the main air channel with the side port so that the leading insert in the column of inserts which is positioned in the slideway is held against the side of the slideway in which the port is positioned, the grooves in the slideway communicating with the main air channel and cooperating and communicating with the slots in the member during a portion of the travel of the member to hold the leading insert in the column of inserts against the bottom of the member, means for reciprocating the member in timed relationship with the indexing of the rotatable turntable for moving the member downwardly in the slideway with respect to the air channels and side port to lower successive inserts into successive aligned apertures in the successive blocks, the movement of the member causing the slots therein to move out of communication with the grooves in the slideway and for cutting off the vacuum pressure holding the successive inserts against the plunger and thus releasing the successive inserts in the successive aperture in the successive block, and means for supporting the elements of the assembling apparatus in cooperative relationship.

9. The article-assembling apparatus of claim 2 in which the means for positioning and supporting the successive articles with the apertures thereof in alignment with the combined plunger and valve member and discharge end of the slideway, comprises a support, a clamping device on the support, a centering device for orienting the articles in the clamping device in preparation for insertion of the inserts in the apertures in the articles, a reciprocating centering slide provided with a cutout portion, a relatively light compression spring mounted in the cutout portion in the centering slide, a camming dowel secured to the centering slide, a centering-pin slide member mounted slidably in the cutout portion of the centering slide for limited movement with respect thereto against the action of the relatively light compression spring, a pivot secured to the slide member, two half-pin members having nose portions forming a centering pin which nose portions are designed to enter into the aperture in the article and strike the support, and means for securing the two half-pin members to the pivot to permit the nose portions of the half-pin members to be spread apart in the aperture in the article by the camming dowel positioned therebetween when the centering slide is moved with respect to the centering pin.

10. The article-assembling apparatus of claim 2 in which the means for positioning and supporting the successive articles with the apertures thereof in alignment with the combined plunger and valve member and discharge end of the slideway, comprises an indexing conveyor, a plurality of clamping devices supported by the conveyor in spaced relationship, a centering device for orienting the articles in the clamping devices in preparation for insertion of inserts in the apertures in the articles, a guide block forming a portion of the centering device and being provided with a vertically extending guideway, a centering slide mounted slidably in the guideway and provided with a cutout portion, means for indexing the conveyor, sliding the centering slide and operating the clamping device in synchronism with the combined plunger and valve member, a relatively light compression spring mounted in the cutout portion of the centering slide, a camming dowel secured to the centering slide, a centering-pin slide member mounted in the cutout portion of the centering slide for limited movement with respect thereto against the action of the relatively light compression spring, a pivot secured to the slide member, two half-pin members having nose portions forming a centering pin which nose portions are designed to enter into the apertures in the articles and strike the conveyor, and resilient means for securing the two half-pin members to the pivot to permit the nose portions of the half-pin members to be spread apart in the apertures in the articles by the camming dowel positioned therebetween when the centering slide is moved with respect to the centering pin by movement of the plunger after the nose portions of the half-pin members engage the conveyor.

11. The article-assembling apparatus of claim 6 in which the means for indexing a succession of blocks with apertures therein in alignment with the combined plunger and valve member and the discharge end of the slideway, comprises a conveyor, means for indexing the conveyor, a plurality of clamping devices supported by the conveyor in spaced relationship, a feeding device including a discharge chute for feeding a column of the blocks having apertures therein in serial end-to-end abutting relationship, an abutment against which the leading block in the column of blocks rests, a reciprocating pusher operated in synchronism with the indexing of the conveyor for feeding successive blocks into successive clamping devices, an escapement assembly for feeding successive blocks one at a time to the reciprocating pusher, a cam-operated release pawl movable into and out of the aperture in the block adjacent to the leading block in the column for pushing the remaining blocks in the column away from the abutment to release the force exerted by the column on the leading block and the abutment to allow the leading block to drop down in front of the pusher member, and means for actuating the pawl in timed relationship with respect to the indexing of the conveyor.

12. The article-assembling apparatus of claim 6 in which the means for indexing a succession of blocks with apertures therein in alignment with the combined plunger and valve member and the discharge end of the slideway, comprises a rotary turntable, means for indexing the turntable, a plurality of clamping devices supported by the turntable in spaced relationship around the turntable, a feeding device including a discharge chute for feeding a column of the blocks having apertures in the center thereof in serial end-to-end abutting relationship, an abutment against which the leading block in the column of blocks rests, a reciprocating pusher operated in synchronism with the indexing turntable to feed successive blocks into successive clamping devices on one side of the turntable and out of successive clamping devices on the other side of the turntable, an escapement assembly for feeding successive blocks one at a time to the reciprocating pusher, a cam-operated release pawl provided with a yieldable spring-biased pawl head movable into and out of the aperture in the block adjacent to the leading block in the column for pushing the remaining blocks in the column away from the abutment to release the forces exerted by the column on the leading block and the abutment to allow the leading block to drop down in front of the pusher member, and a cam secured to and moved by the pusher member for actuating the pawl.

References Cited in the file of this patent

UNITED STATES PATENTS

| | | |
|---|---|---|
| 2,007,698 | Tear | July 9, 1935 |
| 2,155,958 | Schmidt | Apr. 25, 1939 |
| 2,405,483 | Abrams | Aug. 6, 1946 |
| 2,563,654 | Mackin | Aug. 7, 1951 |
| 2,655,954 | Gartner | Oct. 20, 1953 |
| 2,767,839 | Frommer | Oct. 23, 1956 |